(12) United States Patent  
Forster

(10) Patent No.: US 12,248,837 B2  
(45) Date of Patent: Mar. 11, 2025

(54) METHOD OF OPTIMIZING READ TECHNOLOGY FOR HIGH DENSITY ITEMS

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 443 days.

(21) Appl. No.: 16/540,299

(22) Filed: Aug. 14, 2019

(65) Prior Publication Data

US 2021/0049334 A1    Feb. 18, 2021

(51) Int. Cl.
*G06K 7/10*      (2006.01)
*G06K 19/07*     (2006.01)

(52) U.S. Cl.
CPC ..... *G06K 7/10366* (2013.01); *G06K 19/0723* (2013.01)

(58) Field of Classification Search
CPC ........... G06K 7/10366; G06K 19/0723; G06K 7/10227; G06K 7/10217; G06K 7/10198
See application file for complete search history.

(56) References Cited

U.S. PATENT DOCUMENTS

| | | | | |
|---|---|---|---|---|
| 5,038,023 A | * | 8/1991 | Saliga | G07C 9/33 235/475 |
| 5,729,697 A | * | 3/1998 | Schkolnick | G06Q 20/208 235/383 |
| 5,822,714 A | * | 10/1998 | Cato | G06K 7/10039 702/108 |
| 5,936,527 A | * | 8/1999 | Isaacman | G06K 7/10346 340/568.1 |
| 6,563,425 B2 | * | 5/2003 | Nicholson | G06K 19/07756 340/572.7 |

(Continued)

FOREIGN PATENT DOCUMENTS

EP      1967983      9/2008

OTHER PUBLICATIONS

International Search Report and Written Opinion dated May 20, 2020 issued in corresponding IA No. PCT/US2019/046456 filed Aug. 14, 2019.

(Continued)

*Primary Examiner* — Daniel I Walsh

(57) ABSTRACT

A method of optimizing a RFID reader system to increase the percentage of RFID tags successfully inventoried in a container comprising a relatively large number of RFID tagged items in close proximity to one another. To achieve the greater percentage of successfully inventoried RFID tagged items, a transmitting system capable of reading an RFID tag and a receiving system capable of determining how much of the transmitted power propagates through the volume of RFID tagged items is positioned on either side of the container. A host system in communication with both the transmitting and receiving systems then utilizes one or more parameters of the transmitting system to maximize propagation of the RFID signal through the container and, therefore, increase the percentage of RFID tags successfully inventoried with the ultimate goal being 100%.

22 Claims, 9 Drawing Sheets

(56) References Cited

U.S. PATENT DOCUMENTS

| | | | | |
|---|---|---|---|---|
| 6,724,308 B2* | 4/2004 | Nicholson | G08B 13/2414 | 340/572.1 |
| 7,639,119 B2* | 12/2009 | Carrender | G06K 7/0008 | 340/8.1 |
| 8,432,258 B2* | 4/2013 | Wilkinson | H01Q 21/28 | 340/425.1 |
| 9,013,307 B2* | 4/2015 | Hussain | G16H 10/60 | 340/572.1 |
| 9,740,897 B1* | 8/2017 | Salour | G06K 7/10079 | |
| 10,395,071 B2* | 8/2019 | Forster | G06K 7/10217 | |
| 10,896,301 B2* | 1/2021 | Forster | A61J 1/035 | |
| 11,978,036 B2* | 5/2024 | Johnson | G06K 7/10376 | |
| 2002/0044096 A1* | 4/2002 | Chung | G08B 13/2462 | 343/742 |
| 2004/0046020 A1* | 3/2004 | Andreasson | A61J 1/14 | 235/385 |
| 2004/0135691 A1* | 7/2004 | Duron | G06K 7/10019 | 340/572.7 |
| 2005/0040934 A1* | 2/2005 | Shanton | H04L 67/04 | 340/5.92 |
| 2006/0132351 A1* | 6/2006 | Le Sesne | G01F 23/2845 | 342/124 |
| 2006/0208072 A1* | 9/2006 | Ku | G07F 7/02 | 235/383 |
| 2007/0069017 A1* | 3/2007 | Magens | B65G 1/137 | 235/385 |
| 2007/0080804 A1* | 4/2007 | Hirahara | G06K 7/0008 | 340/572.1 |
| 2007/0096916 A1* | 5/2007 | Liu | H01Q 1/2208 | 343/834 |
| 2007/0102513 A1* | 5/2007 | Scheb | G07G 1/0045 | 235/383 |
| 2007/0268139 A1* | 11/2007 | Sweeney, II | G06K 17/00 | 340/572.1 |
| 2008/0224875 A1* | 9/2008 | Phillips | G06K 7/10316 | 340/572.8 |
| 2008/0231431 A1* | 9/2008 | Stawar | B62B 3/1408 | 340/8.1 |
| 2008/0231432 A1* | 9/2008 | Stawar | B62B 3/142 | 340/8.1 |
| 2008/0231448 A1* | 9/2008 | Fowler | G08B 13/2417 | 340/572.1 |
| 2008/0237339 A1* | 10/2008 | Stawar | B62B 3/142 | 235/383 |
| 2008/0277594 A1* | 11/2008 | Wagner | G21F 5/018 | 250/432 PD |
| 2009/0001166 A1* | 1/2009 | Barkan | G06K 7/10801 | 235/462.14 |
| 2009/0143923 A1* | 6/2009 | Breed | G06V 30/194 | 701/1 |
| 2009/0231142 A1* | 9/2009 | Nikitin | G06K 7/0008 | 340/572.8 |
| 2009/0237217 A1* | 9/2009 | Ohkubo | B65D 25/20 | 340/10.3 |
| 2009/0322486 A1* | 12/2009 | Gerstel | B65G 1/1371 | 340/10.1 |
| 2010/0066497 A1* | 3/2010 | Lim | G06Q 10/08 | 340/10.1 |
| 2011/0084834 A1* | 4/2011 | Sabeta | G06K 19/077 | 340/540 |
| 2011/0253715 A1* | 10/2011 | Phaneuf | B65D 53/04 | 156/69 |
| 2014/0015641 A1* | 1/2014 | White | G06K 19/0715 | 340/10.1 |
| 2014/0015642 A1* | 1/2014 | White | G06K 7/10168 | 340/10.1 |
| 2018/0307877 A1* | 10/2018 | Sundaresan | G07G 1/0081 | |
| 2019/0069728 A1* | 3/2019 | Alfarra | A23N 12/02 | |
| 2020/0050806 A1* | 2/2020 | Forster | G06K 19/07796 | |
| 2020/0161742 A1* | 5/2020 | Leitermann | G06Q 10/087 | |
| 2020/0172247 A1* | 6/2020 | Gonzalez | F24H 9/2021 | |
| 2021/0003624 A1* | 1/2021 | Tatsuta | G01R 29/0892 | |
| 2021/0049334 A1* | 2/2021 | Forster | G06K 7/10316 | |
| 2021/0365649 A1* | 11/2021 | Mullen | G06K 7/10445 | |
| 2024/0156545 A1* | 5/2024 | Lenzenhuber | A61B 90/98 | |

OTHER PUBLICATIONS

International Preliminary Report on Patentability dated Feb. 8, 2022 issued in corresponding IA No. PCT/US2019/046456 filed Aug. 14, 2019.

* cited by examiner

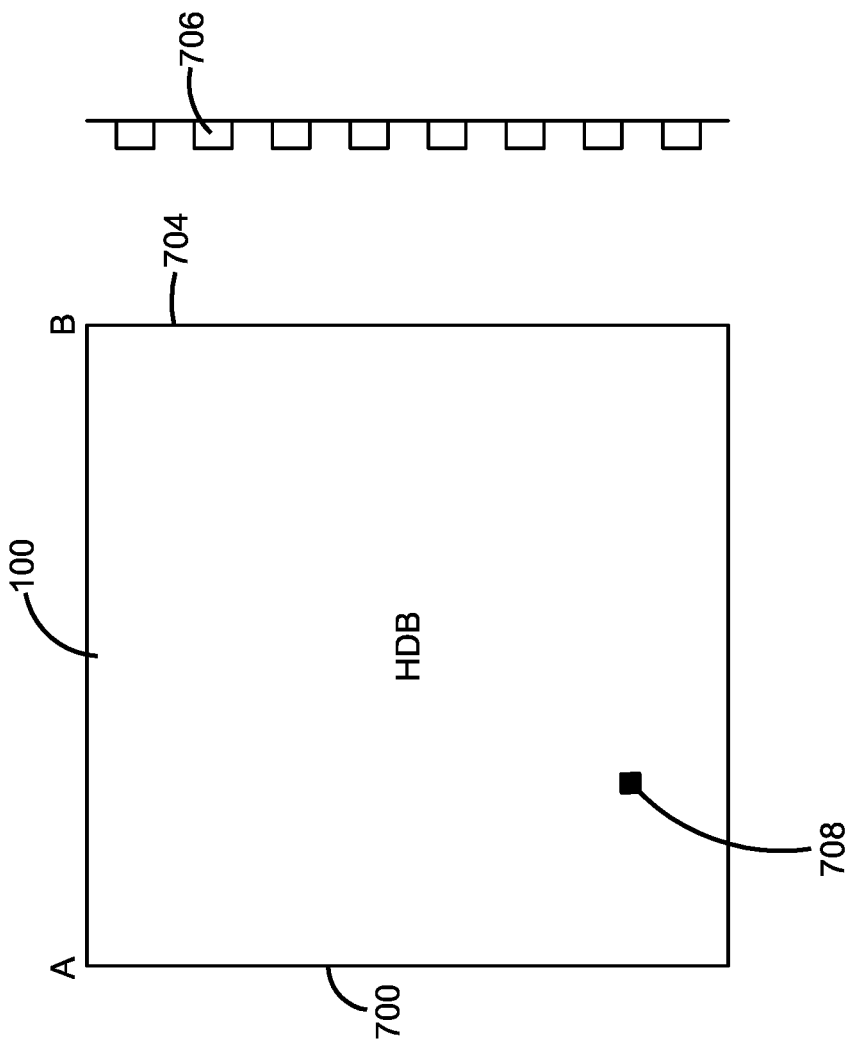
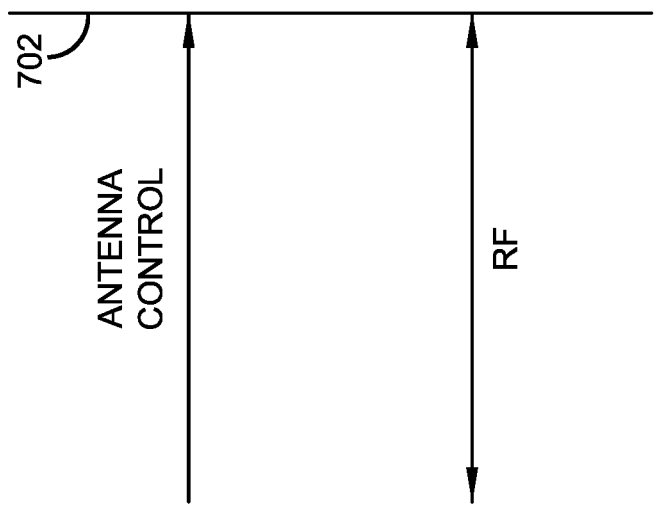
FIGURE 7

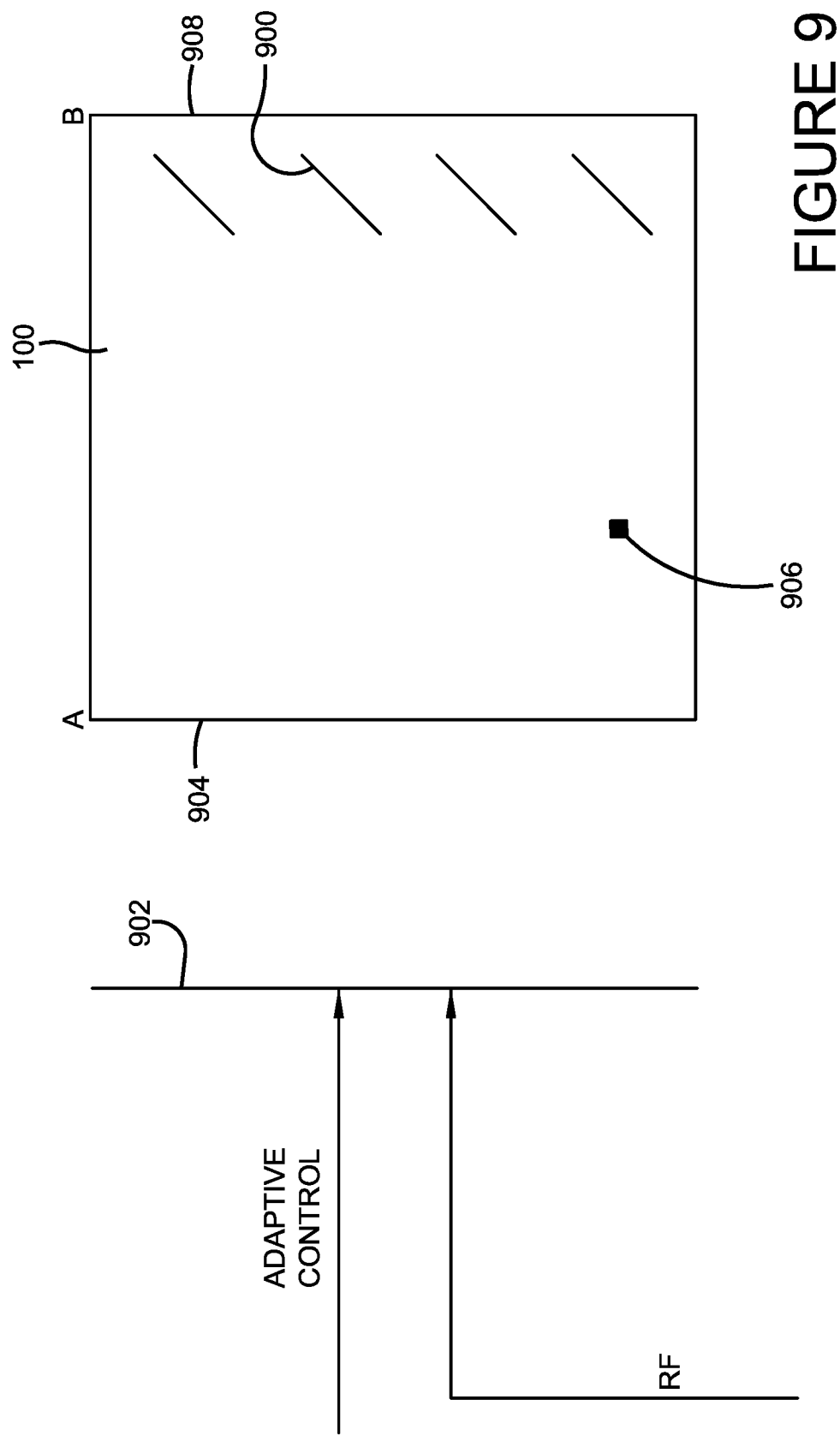

METHOD OF OPTIMIZING READ TECHNOLOGY FOR HIGH DENSITY ITEMS

BACKGROUND

The present invention relates generally to a method of optimizing a reader system to inventory a relatively large number of radio-frequency identification ("RFID") tagged items. Specifically, the method allows for propagating a radio frequency ("RF") signal through a volume, such as a package or other container, containing a high number or density of RFID tagged items. The present method is especially suitable for scanning items containing a large number of RFID tagged items that are in close proximity to each other, for example, a large number of relatively small products with RFID tags attached thereto and placed in a shipping container of high density box. Accordingly, the present specification makes specific reference thereto. However, it is to be appreciated that aspects of the present inventive method are also equally amenable to other like applications and devices.

Generally stated, radio-frequency identification is the use of electromagnetic energy to stimulate a responsive device (known as an RFID "tag" or transponder) to identify itself and, in some cases, provide additionally stored data in the tag. RFID tags typically include a semiconductor device commonly called the "chip" on which are formed a memory and operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags are generally formed by connecting an RFID chip to some form of antenna. Antenna types are very diverse, as are the methods of constructing the same. One particularly advantageous method of making RFID tags is to use a strap, a small device with an RFID chip connected to two or more conductors that can be coupled to an antenna. The coupling of the conductors to the antenna can be achieved using a conductive connection, an electric field connection, magnetic connection or a combination of coupling methods.

RFID tags may be incorporated into or attached to articles to be tracked. In some cases, the tag may be attached to the outside of an article with adhesive, tape, or other means and, in other cases, the RFID tag may be inserted within the article, such as being included in the packaging, located within the container of the article, or sewn into a garment. Further, RFID tags are manufactured with a unique identification number which is typically a simple serial number of a few bytes with a check digit attached. This identification number is incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be tracked and, once attached, the serial number of the tag is associated with its host article in a computer database.

Notwithstanding the many benefits of RFID technology and the many potential uses of RFID tags, one current limitation of current RFID tag designs relates to the inventorying of a shipping container, packaging or other volume containing a large number of RFID tag items in relatively close proximity to each other. More specifically, the close proximity of a relatively large number of RFID tag items in a confined space tends to make it difficult for the RFID reader or interrogator to successfully detect and interrogate 100% of the RFID tagged items due to potential interferences caused by the other RFID tagged items in close proximity thereto.

Therefore, there exists in the art a long felt need to increase the percentage of RFID tagged items successfully interrogated when a relatively large number of RFID tagged items are placed in a relatively confined space and in close proximity to one another. The present invention discloses a method of optimizing a RFID reader system to increase the percentage of RFID tags successfully inventoried. To achieve a greater percentage of successfully inventoried RFID tagged items, on either side of the container containing the RFID tagged items there is positioned a transmitting system, capable of reading an RFID tag, and a receiving system, capable of determining how much of the transmitted power propagates through the volume of RFID tagged items, is positioned on the opposite side of the container. One or more parameters of the transmitting system is then adapted by a host system in communication with both the transmitting and receiving systems to maximize propagation of the RFID signal through the container containing the RFID tagged items in close proximity to one another and, therefore, increase the percentage of RFID tags successfully inventoried.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of optimizing a RFID reader system to inventory a container containing a relatively large number of RFID tagged items that are in close proximity to one another. The method comprises positioning a transmitting system, capable of reading an RFID tag, and a receiving system, capable of determining how much of the transmitting power propagates through the container on opposite sides of the container, and then adjusting one or more of the parameters of the transmitting system via a host system which is in communication with both the transmitting and receiving systems. By adjusting the one or more parameters, a user may maximize the propagation of the RFID interrogation signals through the container and, therefore, increase the percentage of RFID tags successfully inventoried in the container with an ultimate goal of 100%.

In another embodiment, two RFID antenna arrays are positioned on either side of a container containing of relatively large number of RFID tagged items in close proximity to one another. Each of the antenna arrays may comprise one or more antennas and near field elements, where the phase and amplitude of the same can be varied to synthesize far field directional antenna beams and localized near field properties. A host system may then be used to alter the antenna characteristics in either or both of the near and far fields to optimize RFID signal transmission through the container and, therefore, increase the percentage of RFID tags successfully inventoried in the container with an ultimate goal of 100%.

In another embodiment, the method of the present invention utilizes directional beams to direct RF power along vectors in the container. The vectors may be adjusted to ensure that all appropriate areas of the container receive an adaptive transmission signal. In a further embodiment, an adaptive antenna on one side of the container transmits into the container to an array of RFID tags of known identities and properties on the other side of the container at the highest possible received signal strength in order to read the RFID tags within the container as well.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 7 illustrates a perspective view of a container wherein an adaptive antenna is positioned on one side of said container, and an array of RFID tags of known identities and properties are positioned on the opposite side of the container in accordance with the disclosed architecture.

FIG. 9 illustrates a perspective view of a container wherein the adaptive antenna on one side of the container reads RFID tags of a known identity near the surface of the container in accordance with the disclosed architecture.

DETAILED DESCRIPTION

Figure 1:
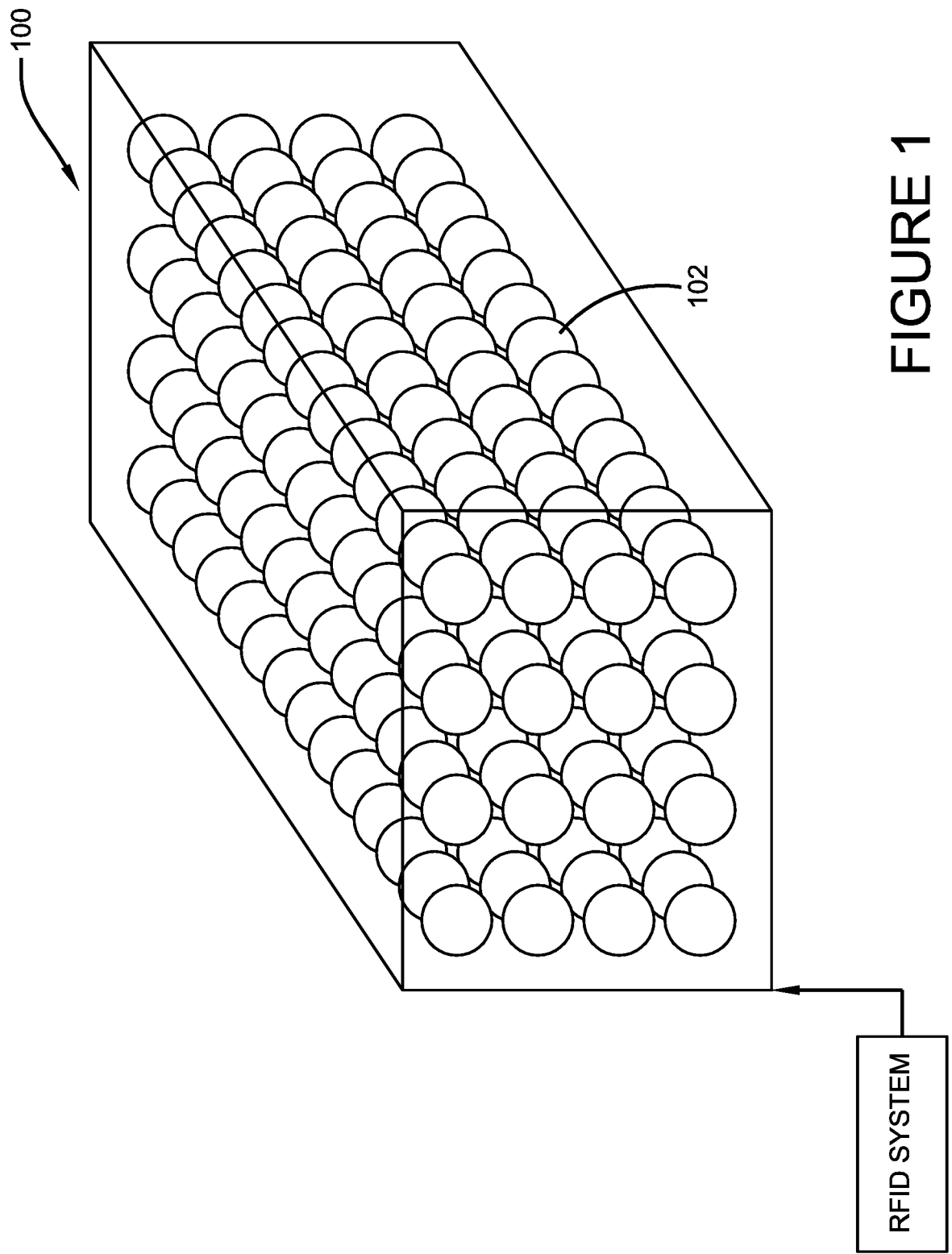
FIG. 1 illustrates a perspective view of a container comprising a relatively large number of RFID tagged items in close proximity to one another, and in communication with an RFID reader system in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a method of optimizing a RFID reader system to increase the percentage of RFID tags successfully inventoried in a shipping container, HDB or other container comprising a relatively large number of RFID tagged items in close proximity to one another with the ultimate goal being 100%. In one embodiment of the present invention, to achieve a greater percentage of successfully inventoried RFID tagged items in a container, a transmitting system that is capable of reading an RFID tag by transmitting RF power to the RFID tag is positioned on one side of the container, and a receiving system that is capable of determining how much of the transmitted RF power propagates through the volume of RFID tagged items in the container is positioned on an opposite side of the container. One or more of the parameters of the transmitting system is then adapted by a host system in communication with both the transmitting and receiving systems to maximize propagation of the RFID signal through the container, thereby increasing the percentage of RFID tags successfully inventoried with an ultimate goal of 100%.

Referring initially to the drawings, FIG. 1 illustrates a basic shipping container 100 or other box or volume containing a plurality of RFID tagged items 102, which are presented to a reader system. The container 100 can be any suitable container as is known in the art for housing, storing and/or shipping items, such as RFID tagged items 102. Further, container 100 can be any suitable size, shape, and/or configuration as is known in the art without affecting the overall concept of the invention. One of ordinary skill in the art will appreciate that the shape and size of the container 100 as shown in FIG. 1 is for illustrative purposes only, and that many other shapes and sizes of container 100 are well within the scope of the present disclosure. Although dimensions of the container 100 (i.e., length, width, and height) are important design parameters for good performance, the container 100 may be any shape or size that ensures optimal performance during use.

Typically, container 100 will house or contain a relatively large number and/or a high density of RFID tagged items 102 in relatively close proximity to one another within container 100, thus the container 100 can be referred to as a high density box (HDB) or other such nomenclature. Obviously, it is desirable when scanning or interrogating a box or container, such as container 100, to detect all of its contents or, in this case, 100% of RFID tagged items 102. However, as previously mentioned, heretofore it has been difficult for an interrogator or RFID reader system to successfully detect and interrogate 100% of the RFID tagged items 102 in container 100 due to potential interferences caused by the close proximity or relatively high density of RFID tagged items 102 in container 100.

Accordingly, the basic concept of one embodiment of the method of the present invention is to maximize the propagation of an RF signal through container 100 in an effort to successfully identify as many of the RFID tagged items 102 contained therein as possible. Thus, if the RF power detected on the opposite side of a container 100 is maximized, the probability of reading the RFID tagged items 102 can be greatly increased. The method of the present invention comprises adapting a RFID reader system to propagate a RF signal through a volume of RFID tagged items 102 in a container 100, and determine if the desired propagation of the RF signal has been achieved. If the desired propagation of the RF signal hasn't been achieved, one or more algorithms can be used to modify the adaptation of the RFID reader system to increase its performance and the percentage of RFID tagged items successfully read with the ultimate goal being 100%.

Figure 2:
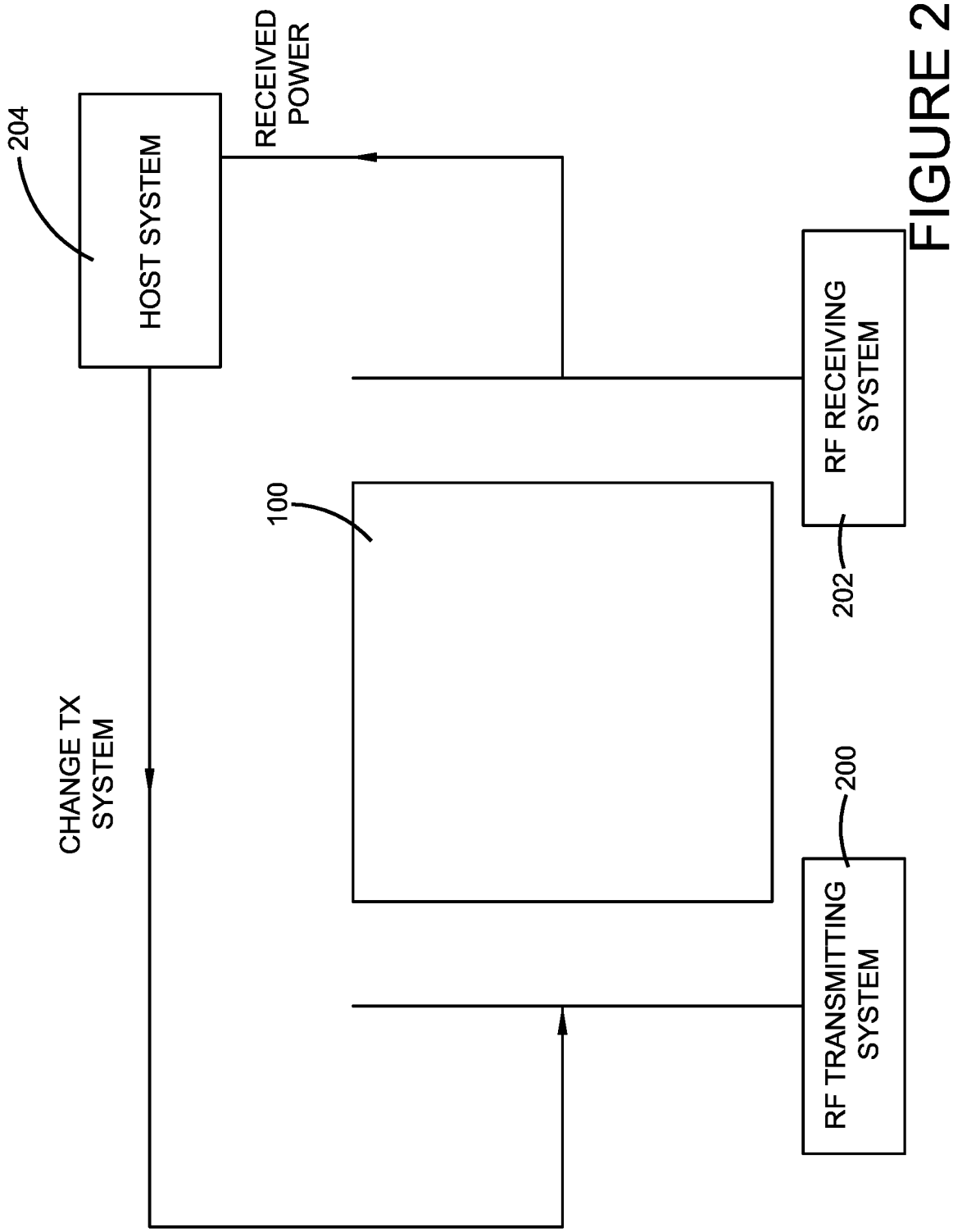
FIG. 2 illustrates a perspective view of a container with a transmitting system and a receiving system positioned on opposite sides of the container, wherein both the transmitting and the receiving systems are in communication with a host system in accordance with the disclosed architecture.

A system configuration of the disclosed method is shown in FIG. 2, wherein a RF transmitting system 200 is positioned on one side of a shipping container 100, and an RF receiving system 202 is positioned on the opposite side of container 100. Each of RF transmitting system 200 and RF receiving system 202 are in communication with a host system 204. Each of RF transmitting system 200, RF receiving system 202 and host system 204 may be any RF transmitting, receiving or hosting system commonly known in the art including those presently being manufactured and sold by Avery Dennison Corporation of Pasadena, California.

The RF transmitting system 200 is capable of reading an RFID tagged item in container 100, and the RF receiving system 202 is capable of determining how much of the transmitted RF power propagates through the volume of the container 100 from RF transmitting system 200. Based on the feedback received from the RF receiving system 202, one or more parameters of the RF transmitting system 200 may be changed or modified by the host system 204 to maximize propagation of the RF signal through container 100, thereby increasing the percentage of RFID tagged items 102 contained in container 100 that are successfully inventoried. The one or more parameters of the RF transmitting system 200 that may be modified include, without limitation, antenna beam pattern, output power, power in a band, modulation quality, phase noise, and any other suitable parameters as are known in the art. Specifically, the RF receiving system 202 transmits the received power to the host system 204, and the host system 204 then transmits parameter changes TX to the RF transmitting system 200 based on the received power of the RF receiving system 202. The altered parameters of the RF transmitting system 200 are, in turn, designed to maximize propagation of the RF signal through the volume of RFID tagged items 102 in container 100, thereby allowing for an increase in the number of RFID tagged items 102 successfully inventoried.

Figure 3:
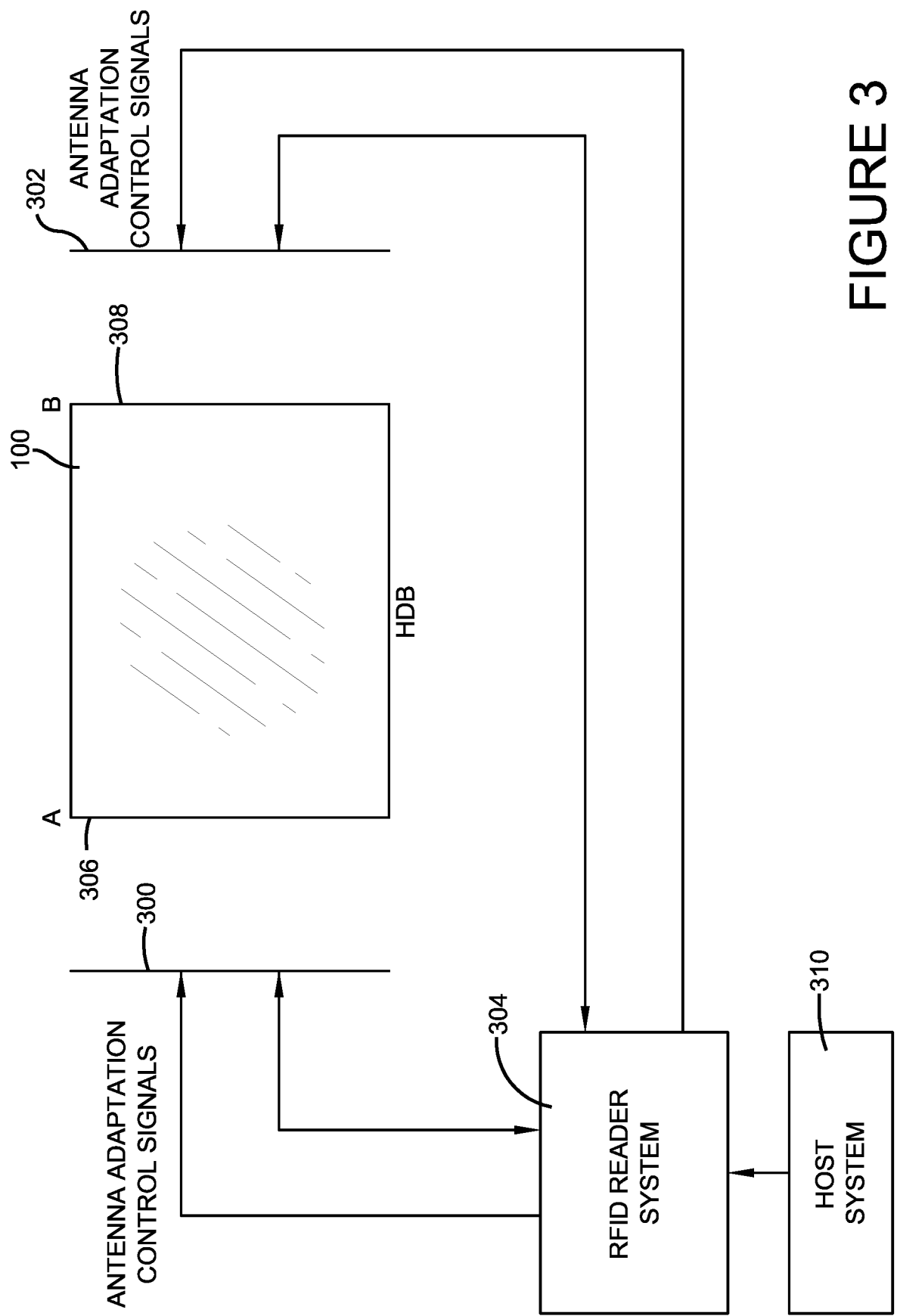
FIG. 3 illustrates a perspective view of a container or high density box ("HDB") with two antenna arrays placed on opposite sides of the container, wherein the two antenna arrays are in communication with an RFID reader system and, ultimately, a host system in accordance with the disclosed architecture.

As shown in FIG. 3, an embodiment of the method is disclosed wherein two antenna arrays 300 and 302 are placed on opposite sides of the container (or high density box) 100. For example, antenna array 300 may be positioned near side A 306, and antenna array 302 may be positioned near side B 308. As is known in the art, the arrays 300 and 302 may consist of one or more antennas and near field elements (not shown), wherein the phase and amplitude of the same can be varied to synthesize far field directional antenna beams and localized near field properties. In this particular embodiment of the present invention and in addition to its primary function of interrogating RFID tags 102, RFID reader system 304 may also measure the RF power being received on either side of the container 100 from the transmitter located on the opposite side. For example, RFID reader system 304 may measure the RF power reception on side B 308 from a transmission originating from side A 306, and vice versa. As previously described, a host system 310 communicates with the RFID reader system 304, which measures the RF power being received and transmitted, and is able to change the antenna characteristics (or alter the parameters) in both near and far fields to optimize RF signal transmissions through the space or volume in the container 100 or high density box, thereby allowing for an increase in the number of RFID tagged items 102 successfully inventoried.

Figure 4:
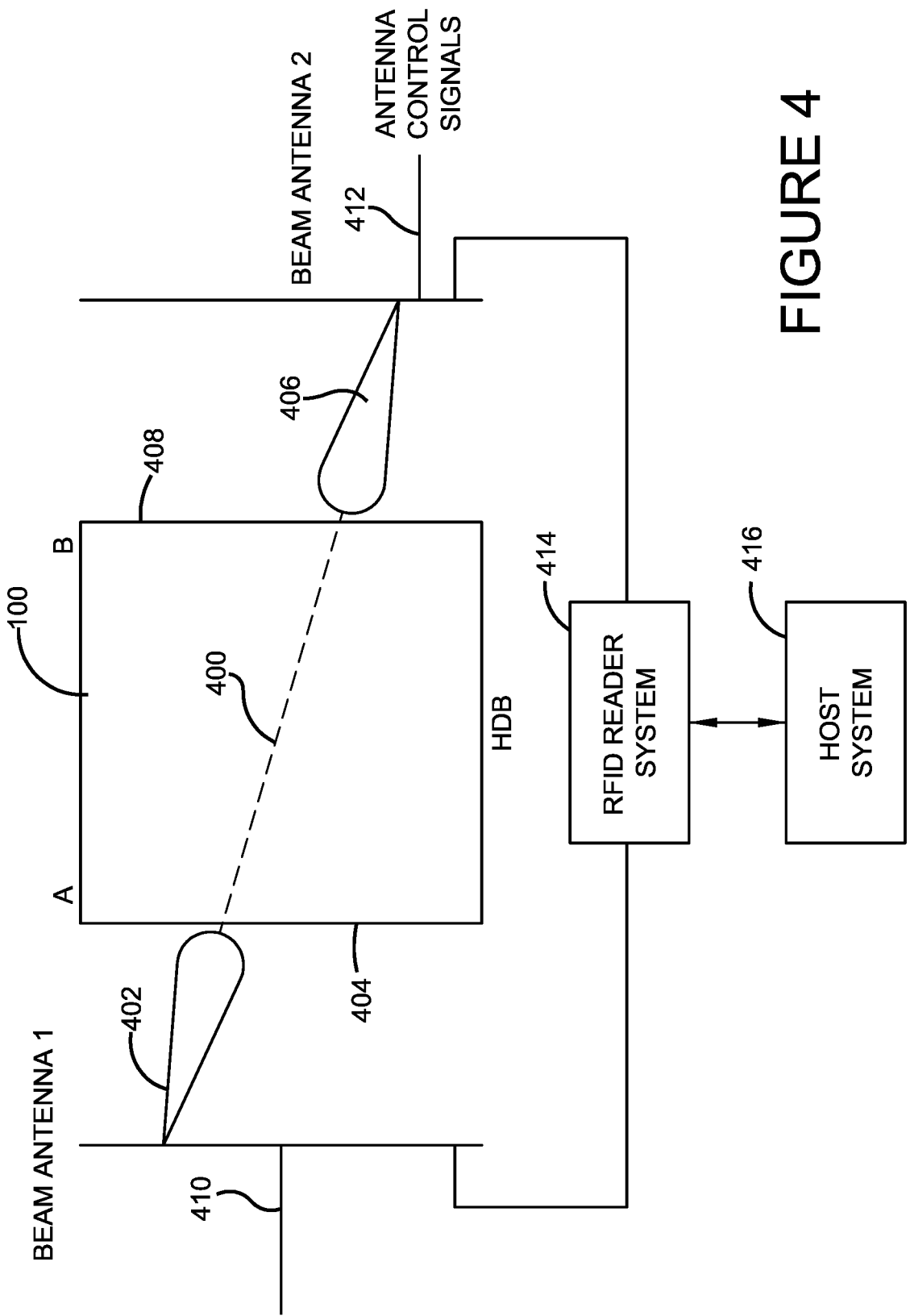
FIG. 4 illustrates a perspective view of a container with two antennas placed on opposite sides of the container, wherein the antennas use directional beams to direct RF power along vectors in the container in accordance with the disclosed architecture.

In another embodiment shown in FIG. 4, the method of the present invention utilizes directional beams (402 and 406) to direct RF power along vectors 400 in the container 100, wherein the vectors 400 may be adjusted to ensure that all appropriate areas of the high density box or container 100 have had an adaptive RF transmission, which greatly increases the likelihood that all RFID tagged items 102 will be successfully inventoried. Although illustrated in two dimensions, it will be appreciated that container 100 is a three dimensional object, and that vectors 400 will be passed through container 100 in three dimensions.

More specifically, first beam antenna 402 may be positioned on side A 404 of the container 100, and second beam antenna 406 may be positioned on an opposing side B 408 of container 100, as illustrated in FIG. 4. Antenna control signals 410 and 412 are then transmitted into the container 100 using a directional signal, and follow the vectors 400, which represent the shortest path through the container 100 between first and second beam antennas 402, 406, respectively. A RFID reader system 414 reads or interrogates the RFID tagged items 102 in container 100, and measures the RF power being received on opposite sides of the container 100 when the RF power is transmitted from one side of the container 100 to the other. Further, a host system 416 communicates with the RFID reader system 414 and measures the RF power being received and transmitted by first beam antenna 402 and second beam antenna 406, and is able to change the antenna characteristics or parameters via algorithms. More specifically, the host system 416 algorithms function to maximize RF power transmission along the vector 400 passing between side A 404 and side B 408, thereby allowing for an increase in the number of RFID tagged items 102 successfully inventoried.

Figure 5:
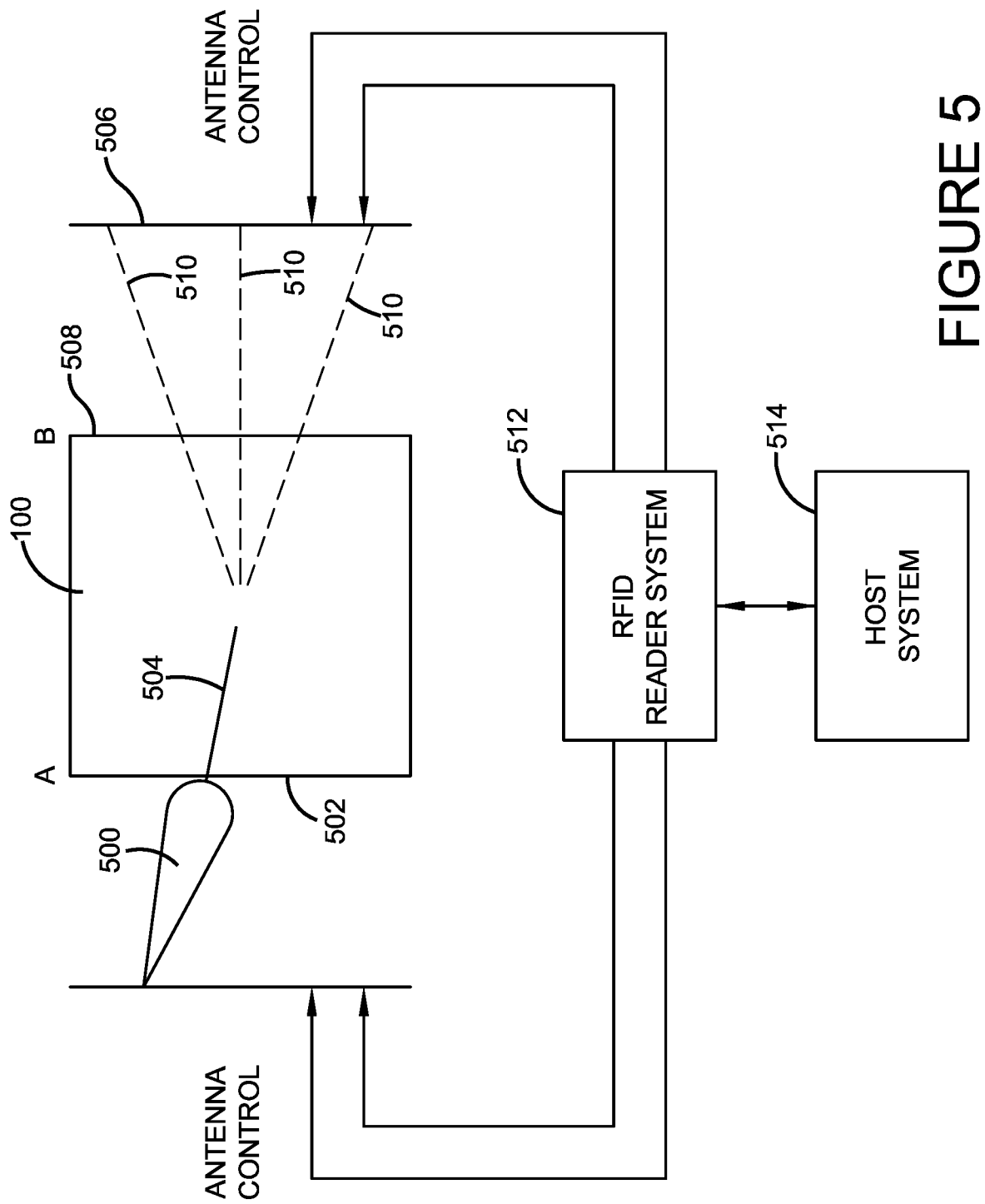
FIG. 5 illustrates a perspective view of a container with two antennas placed on opposite sides of the container, wherein the antenna array on one side of the container transmits a directional signal into the container, and the antenna array on the opposite side of the container receives the directional signal, which may have scattered while passing through the container, all in accordance with the disclosed architecture.

FIG. 5 illustrates a further alternative embodiment of the method of the present invention wherein an antenna array 500 on side A 502 of the container 100 transmits RF power into the container 100 using a directional signal 504. However, because metallic items or the RFID antennas of RFID tagged items 102 in container 100 can scatter the directional signal, antenna or antennas 506 on side B 508 of container 100 will receive an integral of the RF power arriving at multiple points 510 along its surface, as the RF power no longer emerges along the vector originally generated at side A 502.

Similar to the other embodiments described above, a RFID reader system 512 reads or interrogates the RFID tagged items 102 in container 100, and measures the RF power being received on side B 508 of the container 100 when the RF power is transmitted from side A 502 of the container 100. Further, a host system 514 communicates with the RFID reader system 512 and measures the RF power being received and transmitted, and is able to change the characteristics or parameters of antenna array 500 on side A 502 of container 100. And, as before, the host system 514 drives the antenna array 500 on side A 502 to get maximum propagation of the RF power to side B 508, thereby increasing the overall performance of the RFID reader system 512, as well as the percentage of RFID tagged items 102 successfully read or inventoried with the ultimate goal being 100%.

Figure 6:
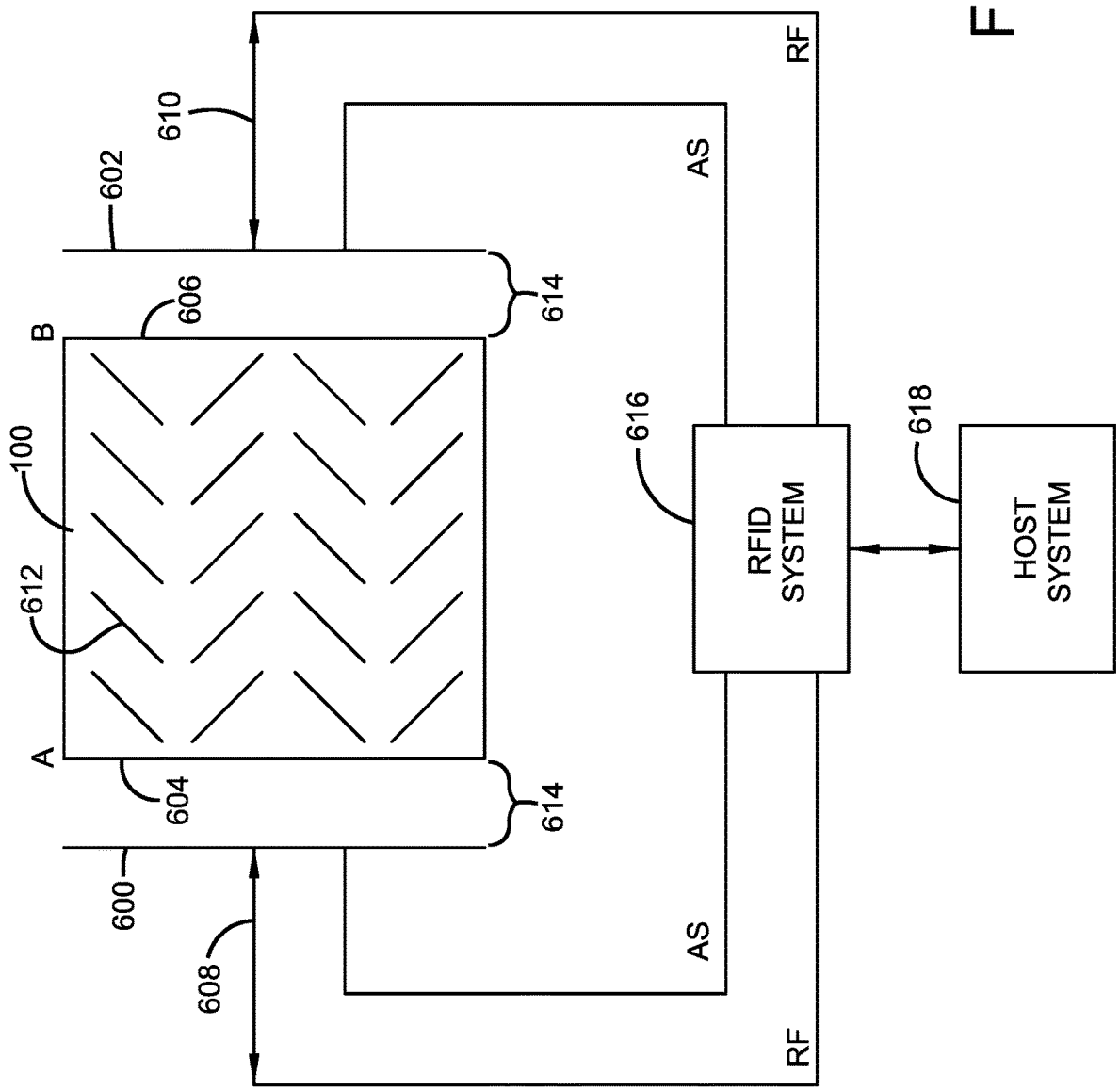
FIG. 6 illustrates a perspective view of a container, wherein the antennas positioned on opposite sides of the container create a magnetic and electric field pattern to couple to the RFID tagged metallic items within the container and utilize the same as a form of transmission medium in accordance with the disclosed architecture.

FIG. 6 depicts a further alternative embodiment of the method of the present invention, wherein a first antenna 600 is positioned on side A 604 of container 100 and a second antenna 602 is positioned on side B 606 of container 100. In this particular embodiment, antennas 600 and 602 are not driven in a way so as to intentionally create a far field antenna beam, but rather antennas 600 and 602 create magnetic and electric nearfield patterns 608 and 610, respectively. The patterns 608 and 610 created are intended to couple to the metallic items 612 in the container 100, and utilize the metallic items 612 as a form of transmission medium between side A 604 and side B 606. This transmission medium may be considered as a far field radiation, if the dimensions of the container 100 are significantly greater than 1.0 wavelength. In a preferred embodiment, first and second antenna arrays 600 and 602 are positioned within a 1.0 wavelength gap 614 of the container 100 sides A 604 and B 606, though other suitable distances may also be utilized as are known in the art.

As previously explained, a RFID reader system 616 reads the RFID tagged items 102 in container 100, and measures the RF power being received on opposite sides of the container 100 when the RF power is transmitted from, for example, side A 604 to side B 606, or vice versa. Further, a host system 618 communicates with the RFID reader system 616 and measures the RF power being received and transmitted, and is able to modify or change the antenna characteristics or parameters to optimize overall system performance. Accordingly, the nature of the magnetic and electrical nearfield patterns 608, 610 presented to the container 100 may be modified to achieve maximum power transmission of the RF signal through container 100, thereby increasing the percentage of RFID tagged items 102 successfully read or inventoried, with the ultimate goal being 100%.

In a further alternative embodiment of the present invention shown in FIG. 7, an adaptive antenna 702 is positioned on side A 700 of container or HDB 100, and an array of RFID tags 706 having known identities and properties are positioned on side B 704, but outside of container 100. Typically, the array of RFID tags 706 comprises lower sensitivity RFID tags that that of the RFID tagged items 708 in container 100. The properties of antenna 702 may be adapted or adjusted to read or interrogate the array of RFID tags 706 on side B 704 at the highest possible received RF signal strength. Thus, the sensitivity of the array of RFID tags 706 on side B 704 may be relatively low compared to the RFID tags 708 used on items in the container 100, so that when RF power at the RFID tag 708 is sufficient to read the array of RFID tags 706 on side B 704, it is probable that RFID tags 708 between the adaptive antenna 702 on side A 700 and the array of RFID tags 706 on side B 704 will also be read. Adaptation of the antenna 702 at side A 700 continues until all of the array of RFID tags 706 on side B 704 have been read. Of course, as with the above described embodiments, a RFID reader system and host system (not shown) can also be employed with this particular embodiment to measure the RF power being transmitted and received, and to make adjustments to the same as appropriate.

Figure 8:
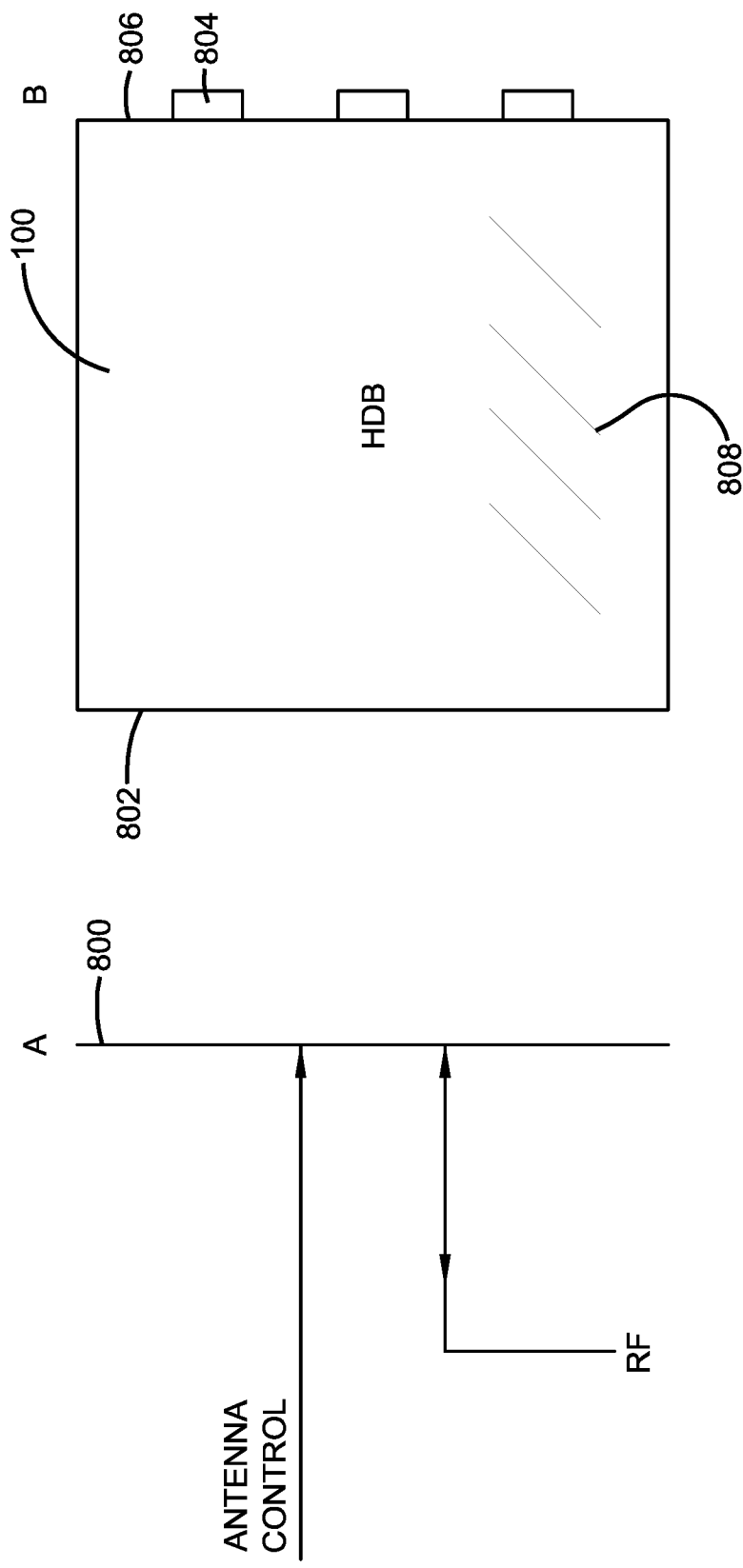
FIG. 8 illustrates a perspective view of a container wherein an adaptive antenna is positioned on one side of said container, and an array of RFID tags are positioned on the outside surface of the container in accordance with the disclosed architecture.

FIG. 8 depicts a further embodiment of the present invention, wherein, similar to the embodiment depicted in FIG. 7, an adaptive antenna 800 is positioned on side A 802 of container or HDB 100 for passing an RF signal through container 100. However, unlike the embodiment in FIG. 7, a plurality or array of RFID tags 804 are positioned on the outside surface of side B 806 of the container. As previously stated, the antenna 800 on side A 802 is adapted to ensure that all RFID tags 804 on side B 806 are read, ensuring that RF power is flowing through the container 100 along appropriate vectors or as a composite transmission medium composed of the metallic items or RFID tags 808 within the container 100 themselves.

Similar to the embodiment depicted in FIG. 7, the array of RFID tags 804 in FIG. 8 preferably comprise lower sensitivity RFID tags so that if said tags 804 are receiving a signal from antenna 800, it is likely that the less sensitive RFID tags 808 in container 100 have also been successfully interrogated or read. As with the above described embodiments, a RFID reader system and host system (not shown) can also be employed with this particular embodiment to measure the RF power being transmitted and received, and to make adjustments to the same as appropriate.

FIG. 9 discloses a further embodiment of the present invention, wherein an adaptive antenna 902 is positioned on side A 904 of container or HDB 100 for passing an RF signal through container 100. However, unlike the embodiment in FIG. 8, a plurality or array of RFID tags 900 are positioned inside of container 100 adjacent to side B 908 of the container. As previously stated, the antenna 902 on side A 904 is adapted to ensure that all RFID tags 900 on side B 908 of the interior of the container are read, ensuring that RF power is flowing through the container 100 along appropriate vectors or as a composite transmission medium composed of the metallic items or RFID tagged items 906 within the container 100 themselves.

The identity of RFID tags 900 near the container 100 surface on side B 908 can be determined by a short range low power scan on side B 908 before entering the adaptive antenna 902 system, or by using packing information for the container 100. As stated previously, the sensitivity of the RFID tags 900 near the container 100 surface is relatively low compared to the RFID tags 906 used on items in the container 100, so that when RF power is sufficient to read the RFID tags 900 near the container 100 surface, it is probable that RFID tags 906 between the adaptive antenna 902 on side A 904 and the RFID tags 900 on side B 908 will also be read or interrogated. As with the above described embodiments, the RFID reader system can be in communication with a host system (not shown) to measure the RF power being transmitted and received, and to make adjustments to the same as appropriate.

It will be appreciated by one of ordinary skill in the art that the adaptation of the antennas may be a continuous process as a container passes the scanning area to allow compensation for the movement relative to the scanning antenna, and any other structure nearby such as the walls of a tunnel reader system. It will be further appreciated that antennas on one or more sides of a container may be identical, but may switch functions between receive and transmit while also adapting to achieve the maximum transmission of RF power through the container and highest possible read accuracy for the RFID tags in the container or high density box.

Importantly, the initial setting of the adaptive antennas of the present invention may be based on learned optimums from previous or historical RFID scanning operations, and then further adapted or modified to improve overall system performance with an ultimate goal of interrogating or inventorying 100% of the RFID tagged items 102 in container or high density box 102. It should also be appreciated that multiple adaptive antennas can be positioned on any side or face of container 100 in accordance with the disclosed architecture.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of optimizing radio frequency (RF) reading of a container of RFID tagged items comprising:
   using an RF transmitting system to propagate an RF signal through the container from a first side to a second side;
   providing an RF receiving system on the second side and measuring the RF signal propagating through the container on the second side;
   providing a host system in communication with the RF transmitting system and the RF receiving system comprising algorithms to maximize RF power transmission from the first side to the second side by selectively altering antenna characteristics of the RF transmitting system based on a measured RF signal received from the RF receiving system, to maximize propagation of the RF signal through the container, wherein the algorithms drive a first antenna of the RF transmitting system and a second antenna of the RF receiving system to create first and second near field electromagnetic patterns, respectively, the first and second near field electromagnetic patterns forming a transmission medium to transmit the RF signal from the first side to the second side; and
   inventorying the RFID tagged items in the container responsive to the altering.

2. The method of claim 1, wherein the RF transmitting system is altered to maximize the RF signal received on the second side.

3. The method of claim 2, wherein one or more parameters of the RF transmitting system are adapted by the host system to maximize propagation of the RF signal through the container.

4. The method of claim 3, wherein the one or more parameters of the RF transmitting system comprise an antenna beam pattern.

5. The method of claim 1, wherein the RF transmitting system identifies the RFID tagged items in the container.

6. The method of claim 1, wherein the RF receiving system receives and measures the RF signal on the second side of the container.

7. The method of claim 1, further comprising positioning an antenna array on each of the first side and the second side of the container, wherein one or more parameters of the antenna arrays are adapted by the host system to create the first and second near field electromagnetic patterns.

8. The method of claim 1, further comprising utilizing at least one directional beam to direct RF power along at least one vector in the container.

9. The method of claim 1, wherein the first side is outside the container and the second side is outside the container at a different side than the first side.

10. A method of optimizing radio frequency (RF) reading of a container of RFID tagged items comprising:
    positioning a first RF system having a first antenna on a first side of the container;
    positioning a second RF system having a second antenna on a second side of the container;
    using the first RF system or the second RF system to transmit a RF signal through the container;
    measuring the RF signal after it passes through the container;
    using the measured RF signal as an input to a host system in communication with both the first and second RF system, the host system altering at least one of the first RF system and the second RF system so as to maximize propagation of the RF signal through the container by selectively driving the first antenna and the second antenna to create first and second near field electromagnetic patterns, respectively, the first and second near field electromagnetic patterns forming a transmission medium to transmit the RF signal from the first side to the second side; and inventorying the RFID tagged items in the container responsive to the altering.

11. The method of claim 10, wherein each of the first and second RF systems is capable of transmitting and receiving the RF signal.

12. The method of claim 10, further comprising a host system in communication with each of the first and second RF systems.

13. The method of claim 10, wherein at least one of the first antenna and the second antenna comprises an antenna array capable of generating a directional RF signal.

14. The method of claim 13, wherein each of the first and second RF systems creates a respective magnetic and electric field pattern using the first antenna and the second antenna, respectively.

15. The method of claim 10, wherein at least one of the first and second RF systems comprises a plurality of RFID tags with known identities.

16. The method of claim 15, wherein ones of the plurality of RFID tags with known identities are selectively positioned in at least one of the following locations: (i) inside the container; (ii) outside the container; or (iii) attached to the container.

17. The method of claim 15, wherein the plurality of RFID tags with known identities have a lower sensitivity than that of the RFID tagged items in the container.

18. The method of claim 10, wherein the first side is outside the container and the second side is outside the container at a different side than the first side.

19. A system for optimizing radio frequency (RF) reading of a container containing a plurality of RFID tagged items comprising:
    a RF transmitting system on a first side of the container for transmitting a RF signal through the container using a first antenna;

a RF receiving system on a second side of the container for receiving and measuring the RF signal using a second antenna; and a host system in communication with the RF transmitting system and the RF receiving system and configured to increase propagation of the RF signal through the container by altering antenna characteristics of the first antenna and the second antenna based on a measurement of the RF signal received from the RF receiving system;

wherein the host system alters the antenna characteristics selectively to drive the first antenna and the second antenna to create first and second near field electromagnetic patterns, respectively, the first and second near field electromagnetic patterns forming a transmission medium to transmit the RF signal from the first side to the second side, and inventories the RFID tagged items in the container responsive to the altering.

20. The system of claim 19, wherein the host system uses the measurement of the transmitted RF signal to adapt an output of at least one of the RF transmitting system and the RF receiving system selectively to alter the first or second near field electromagnetic pattern.

21. The system of claim 19, wherein the RF transmitting system performs at least one of the following functions: (i) propagates a directional beam along a vector; (ii) creates a magnetic and electric field pattern; and (iii) transmits a signal to a plurality of RFID tags positioned in, on or outside of the container and having a lesser sensitivity than that of the plurality of RFID tagged items inside the container.

22. The system of claim 19, wherein the first side is outside the container and the second side is outside the container at a different side than the first side.

\* \* \* \* \*